(12) United States Patent
Gauthier et al.

(10) Patent No.: US 7,238,215 B2
(45) Date of Patent: Jul. 3, 2007

(54) INTEGRATED PROCESS AND INSTALLATION FOR THE PRODUCTION OF SYNTHESIS GAS

(75) Inventors: Pierre-Robert Gauthier, Fresnes (FR); Christian Lacoste, Le Pecq (FR)

(73) Assignee: L'Air Liquide, Société Anonyme à Directoire et Conseil de Surveillance pour l'Etude et l'Exploitation des Procédés Georges Claude, Paris (FR)

( * ) Notice: Subject to any disclaimer, the term of this patent is extended or adjusted under 35 U.S.C. 154(b) by 738 days.

(21) Appl. No.: 10/250,440

(22) PCT Filed: Dec. 21, 2001

(86) PCT No.: PCT/IB01/02615

§ 371 (c)(1),
(2), (4) Date: Jun. 27, 2003

(87) PCT Pub. No.: WO02/051744

PCT Pub. Date: Jul. 4, 2002

(65) Prior Publication Data

US 2004/0055217 A1  Mar. 25, 2004

(30) Foreign Application Priority Data

Dec. 27, 2000  (EP) .................. 00204757

(51) Int. Cl.
*C01B 3/24* (2006.01)
(52) U.S. Cl. .................. 48/198.3; 48/61; 48/85; 48/127.3; 48/127.9; 48/197 R; 48/198.8; 48/198 FM; 423/220; 423/246; 423/248; 422/129; 422/170; 422/188

(58) Field of Classification Search ............ 48/61, 48/127.9, 198.1–198.8, 200–213; 423/648–652
See application file for complete search history.

(56) References Cited

U.S. PATENT DOCUMENTS 6,247,333 B1  6/2001  Rieth et al.
6,277,894 B1  8/2001  Agee et al.

FOREIGN PATENT DOCUMENTS

EP  0212758  4/1987

(Continued)

OTHER PUBLICATIONS

PCT International Search Report dated Apr. 4, 2002 for International Applicantion No. PCT/IB01/02615.

(Continued)

*Primary Examiner*—Glenn A. Caldarola
*Assistant Examiner*—Vinit H. Patel
(74) *Attorney, Agent, or Firm*—Linda K. Russell; Elwood L. Haynes (57) ABSTRACT

In an integrated process for the production of synthesis gas, a partial oxidation unit and a steam methane reformer are used to convert natural gas or another fuel to first and second mixtures of at least carbon monoxide and hydrogen, only the first process consuming oxygen. Carbon dioxide derived from the second mixture is sent to the inlet of the first process to reduce the oxygen consumption. The first and optionally second mixtures may be used as synthesis gas for a process such as a Fischer Tropsch process.

36 Claims, 4 Drawing Sheets

FOREIGN PATENT DOCUMENTS

| | | |
|---|---|---|
| EP | 0307843 | 3/1989 |
| EP | 0522744 | 1/1993 |
| EP | 0930268 | 7/1999 |
| EP | 0982554 | 3/2000 |
| EP | 0999178 | 5/2000 |
| WO | WO0058242 | * 10/2000 |

OTHER PUBLICATIONS

Peter J. A. Tijm, "The Markets for Shell Middle Distillate Synthesis Products", Alternate Energy '95, Vancouver, Canada, May 2-4, 1995.

* cited by examiner

INTEGRATED PROCESS AND INSTALLATION FOR THE PRODUCTION OF SYNTHESIS GAS

BACKGROUND OF THE INVENTION

1. Field of the Invention

The present invention relates to an integrated process and installation for the production of synthesis gas. In particular it relates to a process using two reactors producing synthesis gases containing at least hydrogen and carbon monoxide with a global hydrogen/carbon monoxide ratio between 1.8:1 and 3:1.

2. Description of the Related Art

Due to the economic benefits associated with using natural gas on certain gasfields or oilfields and recent advances in catalytic processes, a certain number of projects for converting natural gas to synthetic hydrocarbons are presently being studied. The processes used can, for example, produce synthetic fuel by the gas-to-liquid process (GTL), olefins by the gas-to-olefins process (GTO), methanol or dimethyl ether (DME). GTL processes are described in 'Shell Middle Distillates Synthesis' by P. Tijm et al., Alternate Energy '94 Apr. 26-29 1994.

These processes generally include three steps:
1) production of synthesis gas (mixture of hydrogen and carbon monoxide)
2) synthesis of hydrocarbon chains
3) distillation and/ or finishing and/or hydrocracking Most of these processes use large amounts of oxygen or oxygen enriched air to produce the synthesis gases in partial oxidation reactors using a non-catalytic or catalytic process. A suitable air separation unit for producing oxygen is described in EP-A-0982554.

The following explanation and description relates to GTL plants but applies also to other synthetic hydrocarbon plants, such as GTO, DME or methanol plants. For GTL processes, the Fischer-Tropsch reaction requires a stoechiometric synthesis gas make-up to be produced with a molar ratio of 2:1.

Additional amounts of hydrogen are needed for the finishing and to compensate for losses in by-products and/or purge gases leading to an increased global $H_2/CO$ ratio of between 2.1:1 and 2.7:1.

Typically a non-catalytic partial oxidation POX unit, when fed with natural gas, produces a synthesis gas with an $H_2/CO$ ratio of about 1.8:1 depending on the composition of the natural gas. This ratio can vary too when other oxidants, such as steam or carbon dioxide, are sent to the unit.

The global $H_2/CO$ ratio can be reached
either by partial shift conversion of the CO produced in the POX unit as described in EP-A-0484136 or by coproducing a second synthesis gas from a steam methane reformer unit (SMR), fed also by natural gas, the second synthesis gas having a $H_2/CO$ ratio typically between 2.7/1 and 6/1.

Thus, the synthesis gas from the POX unit can be combined with synthesis gas from an SMR unit to produce the required global ratio.

When the POX unit is fed with heavier feed stock, such as coal, residues or intermediate by-products, the $H_2/CO$ ratio is typically lower and the above techniques must be used to balance the overall $H_2$ requirements.

Catalytic partial oxidation processes, when fed with natural gas or other light hydrocarbon mixtures, produce synthesis gas with a higher $H_2/CO$ ratio between 2/1 and 3/1 and can be used, as stand alone processes or not, to satisfy the global ratio.

For a given size of GTL plant, using an oxygen fed reactor such as a POX unit and a process which does not use oxygen such as an SMR unit, it is an object of the present invention to optimise the size and number of the POX modules and/or SMR modules and/or ASU modules, constituting the POX unit, SMR unit and the air separation unit, using the latest technical developments for the various modules.

Particularly, in recent years, the output of air separation units has considerably increased. Modular units presently produce 3500 tonnes of oxygen per day and the module should be able to produce 6000 tonnes of oxygen per day in the near future.

SUMMARY OF THE INVENTION

According to the invention, there is provided a process for the production of at least one synthesis gas for a synthesis unit consuming at least one mixture of at least carbon monoxide and hydrogen with a global hydrogen/carbon monoxide ratio between 1.8:1 and 3:1 comprising:
a) sending oxygen having a concentration of at least 99 mol. % and at least one of natural gas, coal and petroleum residues to a first reactor which is a partial oxidation unit to produce a first mixture containing at least carbon monoxide and hydrogen,
b) sending steam and at least one of natural gas and another mixture of light hydrocarbons to a second reactor which is a steam methane reformer to produce at least one second mixture containing at least hydrogen, carbon monoxide and carbon dioxide,
c) sending at least part of the first mixture to form a synthesis gas to be sent to the synthesis unit, and
d) deriving at least one gas containing at least 40 mol. % carbon dioxide from at least part of the second mixture and sending at least part of the at least one gas containing at least 40 mol. % carbon dioxide to inlet of the first reactor.

Optionally the process may also include the following steps:
no air is sent to the first reactor;
sending oxygen to the first reactor from an air separation unit in which liquid is pumped to an operating pressure of the first reactor, vaporised and supplied as gas to the first reactor or alternatively in which gaseous oxygen is warmed and compressed to an operating pressure of the first reactor;
the first mixture has a hydrogen/carbon monoxide ratio of less than 1,8,;
sending an oxidant to the second reactor, preferably constituted at least in part by steam and possibly sending a gas containing at least 40 mol. % carbon dioxide derived from the second reactor to inlet of the second reactor;
treating at least part of the second mixture to form at least one stream containing at least 40 mol. % carbon dioxide and a gas enriched in hydrogen and possibly a synthesis gas with an $H_2/CO$ ratio higher than 2/1;

producing the hydrogen enriched gas from the second mixture by using shift conversion and either pressure swing adsorption (PSA) and/or $CO_2$ removal and methanation processes;

producing the hydrogen enriched gas from the second mixture by using permeation and either pressure swing adsorption and/or methanation processes;

said synthesis gas with a $H_2/CO$ ratio higher than 2/1 is the second mixture or a third mixture produced by the $CO_2$ removal process or a fourth mixture produced by the permeation process.

The $CO_2$ rich gas comes from the PSA unit and/or the $CO_2$ removal unit, which may for example be a washing unit sending at least part of the stream enriched in hydrogen to the synthesis unit;

sending at least part of the stream enriched in hydrogen to a finishing unit;

sending at least part of the second mixture to the synthesis unit;

producing a hydrogen enriched gas and the gas containing at least 40 mol. % carbon dioxide from the second mixture using pressure swing adsorption and possibly shift conversion.

producing a hydrogen enriched gas from the second mixture and the gas containing at least 40 mol. % carbon dioxide using $CO_2$ removal and possibly a methanation process;

sending at least part of a stream enriched in hydrogen derived from at least part of the second mixture to a finishing process downstream the synthesis unit;

the $CO_2$ removal unit is a washing unit, an adsorption unit or a permeation unit;

sending a gas containing at least carbon monoxide and hydrogen from the $CO_2$ removal unit to the synthesis unit and/or to a methanation unit and/or to a permeation unit;

sending a gas containing at least carbon monoxide and hydrogen from the $CO_2$ removal unit to a permeation unit, said gas constituting a third mixture, and sending a hydrogen enriched gas from the permeation unit to an adsorption unit and/or a hydrogen depleted gas to the synthesis unit;

sending part of the third mixture to the synthesis unit;

sending at least part of the gas containing carbon monoxide and hydrogen from the $CO_2$ removal unit to a permeation unit and sending a fourth mixture depleted in hydrogen from the permeation unit to the synthesis unit.

The first reactor may be a non-catalytic or a catalytic partial oxidation reactor.

Preferably the first reactor is fed by an oxygen enriched stream and the second reactor is not fed by an oxygen enriched stream.

According to a further aspect of the invention, there is provided an installation for the production of synthesis gas for a process taking place within a synthesis unit consuming a mixture of at least carbon monoxide and hydrogen with a hydrogen/carbon monoxide ratio of between 1.8:1 and 3:1 comprising: first and second reactors said first reactor being a partial oxidation unit and said second reactor being a steam methane reformer, said first and second reactors each having a respective inlet and outlet, means for sending oxygen having a concentration of at least 99 mol. % to the inlet of the first reactor, said means comprising a cryogenic air separation unit, means for removing liquid oxygen from a column of the air separation unit, means for pumping the liquid oxygen to an operating pressure of the first reactor, means for vaporising the pumped liquid and means for sending the pressurized gas thus produced to the inlet of the first reactor, there being no means for sending air to the inlet of the first reactor, means for sending at least one of natural gas, coal and petroleum residues to the inlet of the first reactor, means for sending steam and natural gas to the inlet of the second reactor; means for producing a first mixture containing at least carbon monoxide and hydrogen constituting a synthesis gas at the outlet of the first reactor, means for producing at least one second mixture containing at least hydrogen, carbon dioxide and carbon monoxide at the outlet of the second reactor, means for deriving at least one gas containing at least carbon dioxide from the outlet of the second reactor and means for sending at least part of the gas containing at least carbon dioxide to the inlet of the first reactor and possibly to the inlet of the second reactor.

Preferably the first reactor is a partial oxidation reactor, with or without a catalyst bed.

Optionally:

the means for deriving a gas containing at least carbon dioxide from the outlet of the second reactor include a $CO_2$ removal unit, such as a washing unit, means for sending a gas from the outlet of the second reactor to the $CO_2$ removal unit and means for sending at least part of the gas containing carbon dioxide from the $CO_2$ removal unit to the inlet of the first reactor and optionally to the inlet of the second reactor;

the installation comprises means for sending a gas containing at least carbon monoxide and hydrogen from the $CO_2$ removal unit to the outlet of the first reactor and/or to the synthesis unit;

the installation comprises a permeation unit and means for sending a third mixture from the $CO_2$ removal unit to the permeation unit and means for sending a gas containing hydrogen and carbon monoxide from the permeation unit to the synthesis unit consuming the synthesis gas;

the means for deriving a gas containing at least carbon monoxide and hydrogen from the outlet of the second reactor include an adsorption unit and optionally a shift reactor upstream the adsorption unit, means for sending gas from the outlet of the second reactor to the adsorption unit, optionally via the shift reactor and/or via the $CO_2$ removal unit and the permeation unit, and means for sending a gas containing at least carbon dioxide from the adsorption unit to the inlet of the first reactor and/or of the second reactor;

the installation comprises means for sending a gas containing at least hydrogen from the adsorption unit to the outlet of the finishing unit and/or to the synthesis unit;

the installation comprises a synthesis unit consuming a mixture of at least carbon monoxide and hydrogen with a hydrogen/carbon monoxide ratio of between 1.8:1 and 3:1, a finishing unit, means for sending fluid from the outlet of the first reactor to the synthesis unit and means for sending fluid from the outlet of the synthesis unit to the finishing unit.

Preferably the gas containing at least hydrogen sent from the adsorption unit to the finishing unit is purer in hydrogen than the gas containing at least hydrogen sent from the adsorption unit to the outlet of the first reactor or to the synthesis unit.

Preferably the hydrogen enriched stream is sent to the finishing unit and a synthesis gas containing an $H_2/CO$ ratio higher than 2/1 is sent to the synthesis unit.

Preferably at least a part of the $CO_2$ present in this synthesis gas is removed in order to minimise the $CO_2$ which is sent to the synthesis unit.

In some cases at least two $CO_2$ rich gases are sent to the first reactor, each being derived from the different means such as a $CO_2$ removal washing unit and an adsorption unit.

The process consuming a synthesis gas with a hydrogen/carbon monoxide ratio of between 1.8:1 and 3:1 may for example be a process for production of olefins, methanol, synthetic fuel, DME etc.

By adding carbon dioxide to the feed of the first reactor, which may be of the catalytic or non-catalytic partial oxidation type, the equilibrium of the reaction is modified so that the same quantity of carbon monoxide is produced, with less oxygen feed and the ratio of $H_2CO$ is reduced at the outlet of the first reactor.

Thus the quantities of hydrogen and synthesis gas from the first reactor decrease and the capacity of the second reactor is increased to balance the overall hydrogen requirements.

In this way, less oxygen can be used in the first reactor since the $CO_2$ takes part in the partial oxidation.

BRIEF DESCRIPTION OF THE DRAWINGS

The invention will now be described with reference to the accompanying drawings of which.

DETAILED DESCRIPTION

Figure 1:
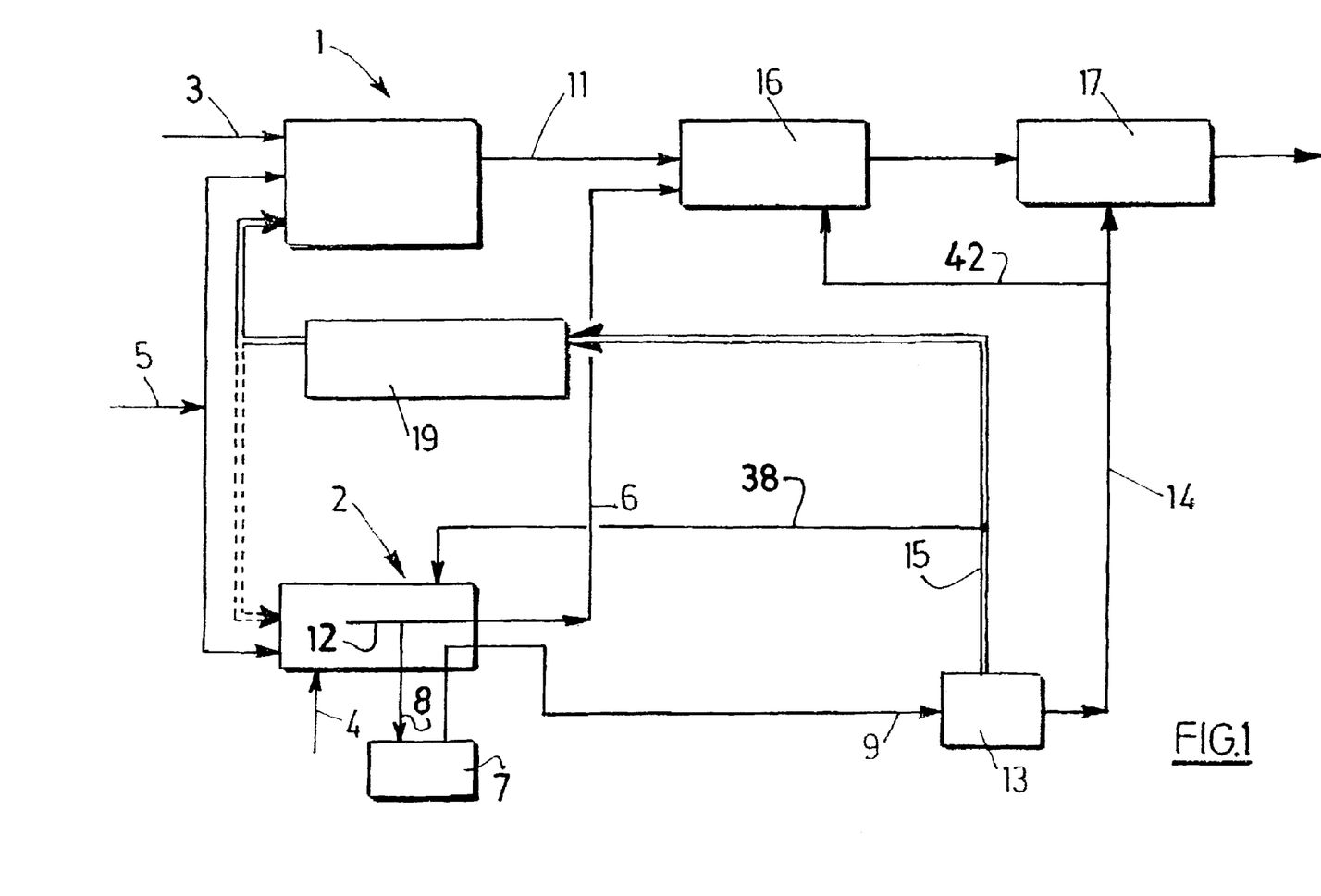
FIG. 1 is a process flow diagram of an integrated process according to the invention using a shift conversion unit and a pressure swing adsorption unit to produce a hydrogen rich stream.

In FIG. 1, natural gas 5 is sent to a first reactor 1 which is the POX type and to a second reactor 2 which is of the SMR type. A gas 3 containing at least 99 mol. % oxygen is also sent to the first reactor 1 to produce a first mixture 11 containing at least hydrogen and carbon monoxide in proportions of less than 1.8:1 to be sent to a synthesis unit 16. Steam 4 is sent to the second reactor 2.

The second reactor 2 produces a second mixture 12 containing at least carbon monoxide, carbon dioxide and hydrogen. At least part 8 of this mixture is then sent to a shift converter 7 where at least part of the carbon monoxide is reacted with steam to form hydrogen and carbon dioxide. The gas 9 produced by the shift unit 7 is sent to an adsorption unit 13 of the PSA type to produce a stream rich in hydrogen 14 and a stream rich in carbon dioxide 15 containing between 40 and 70 mol. % carbon dioxide. Part 38 of the stream rich in carbon dioxide may be sent to the second reactor 2 to serve as unpressurized fuel.

It will be appreciated that it is not absolutely necessary in all cases for the second mixture to undergo shift conversion.

The rest 6 of the second mixture 12 is sent to the synthesis unit 16. Alternatively all the second mixture may be sent to the adsorption step (possibly following shift conversion).

All or part of the hydrogen rich stream 14 is sent to the finishing unit 17.

Part 42 of the stream rich in hydrogen 14 may also be sent to the synthesis unit 16. The products of the synthesis unit 16 are treated in a finishing unit 17 before leaving the installation. All or part of the carbon dioxide rich stream 15 is sent to a compressor 19 where it is compressed to a higher pressure, before being fed to the first reactor 1 as a feed gas and, optionally, as shown in dashed lines, to the second reactor 2. Any remaining portion 38 of the carbon dioxide rich stream may be sent to the second unit 2 as fuel.

It will be appreciated that the first reactor could be of the catalytic or non-catalytic type. It will further be appreciated that streams 11,6 and/or 42 may be sent separately to synthesis unit 16 or may be mixed beforehand.

Figure 2:
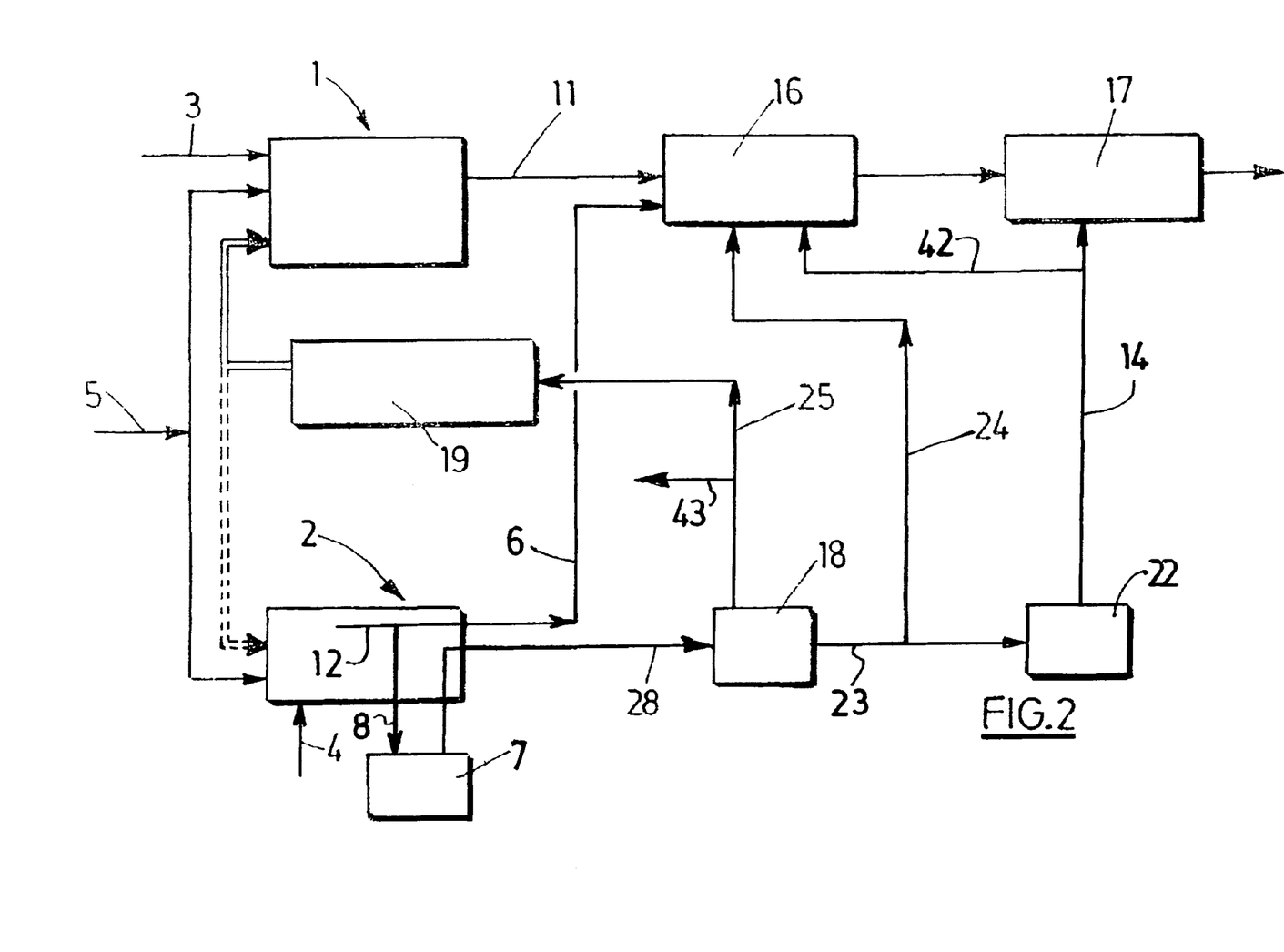
FIG. 2 is a process flow diagram of an integrated process according to the invention using a shift conversion unit, a $CO_2$ removal unit and a methanation unit, to produce a hydrogen rich stream.

In FIG. 2, natural gas 5 is sent to a first reactor 1, which is of the POX type and/or to a second reactor 2 which is of the SMR type.

A gas 3 containing at least 99 mol. % oxygen is sent to the first reactor 1 to produce a first mixture 11 containing at least hydrogen and carbon monoxide in proportions of less than 1.8:1 to be sent to the synthesis unit 16, which may be of the Fischer Tropsch type.

Steam 4 is sent to the second reactor 2.

The second reactor 2 produces a second mixture 12 containing at least carbon monoxide, carbon dioxide and hydrogen. Part 6 of the second mixture may be sent directly to synthesis unit 16 without mixing with another gas (in this example). Another part 8 or all of this second mixture is then sent to a shift conversion unit 7, then stream 28 formed in the shift converter is sent to a $CO_2$ removal unit 18, such as an amine washing unit, to produce a third mixture stream 24 containing carbon monoxide and a stream rich in carbon dioxide 25, preferably containing between 90 and 100 mol. % carbon dioxide.

Other types of $CO_2$ removal unit 18 may also be envisaged such as a permeation unit or a washing unit employing a washing solution other than an amine solution.

Part of the stream 23 may be sent to the synthesis plan 16.

The rest 24 of the hydrogen rich stream 23 from the $CO_2$ removal unit 18 is sent to a methanation unit 22 in which the last traces of carbon monoxide and carbon dioxide are removed. This purified hydrogen rich gas is sent to the finishing unit 17 (streams 14) and part of it may be sent to the synthesis unit 16 (stream 42).

All or part of the carbon dioxide rich stream 25 is sent to a compressor 19 where it is compressed to a higher pressure, before being fed to the first reactor 1 and, optionally, as shown in dashed lines to the second reactor 2.

Part 43 of the stream 25 may be removed as a purge stream. The products of the synthesis unit 16 are treated in a finishing unit 17 before leaving the installation.

It will be appreciated that the first reactor 1 could be of the catalytic or non-catalytic type. It will further be appreciated that streams 11,6 and/or 24 and/or 42 may be sent separately to synthesis unit 16 or may be mixed beforehand.

Figure 3:
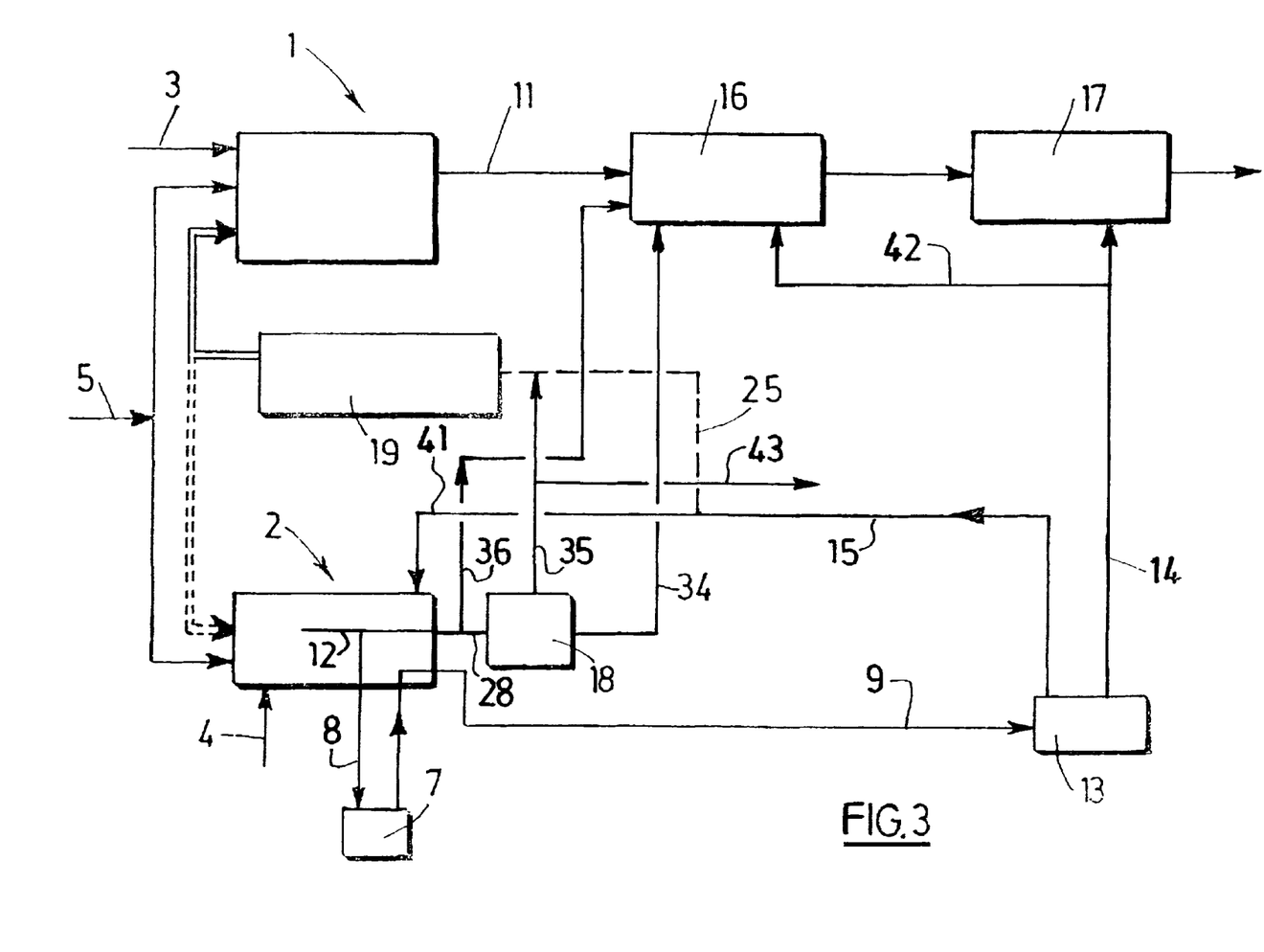
FIG. 3 is a process flow diagram of an integrated process according to the invention using a shift conversion unit, a pressure swing adsorption unit to produce a hydrogen rich stream and a $CO_2$ removal system to treat part of the second mixture.

In FIG. 3, natural gas 5 is sent to a first reactor which is of the POX type 1 and/or to a second reactor 2 which is of the SMR type. A gas 3 containing at least 99 mol. % oxygen is also sent to the first reactor 1 to produce a first mixture 11 containing at least hydrogen and carbon monoxide in proportions of less than 1.8:1. Steam 4 is sent to the second reactor 2.

The second reactor 2 produces a second mixture 12 containing at least carbon monoxide, carbon dioxide and hydrogen. Part 6 of this mixture may or may not then be sent to a shift conversion unit 7 integrated within the second reactor 2 where at least part of the carbon monoxide is reacted with steam to form hydrogen and carbon dioxide. The gas 9 produced by the shift unit is sent to an adsorption unit 13 of the PSA type to produce a stream rich in hydrogen 14 and a stream rich in carbon dioxide 15 containing between 40 and 70 mol. % carbon dioxide. The stream rich in carbon dioxide may be sent totally or in part (41) to the second reactor 2 as fuel or may be totally or in part (25 in dashed lines) recycled to the inlet of the first reactor 1 as previously described.

At least a part 28 of the second mixture is sent to a carbon dioxide removal unit 18, such as a washing unit, which produces a further stream rich in carbon dioxide 35 and a third mixture containing hydrogen and carbon monoxide 34. The other part 36, if there is one, is directly sent to the synthesis unit 16. The stream rich in carbon dioxide 35 is partially or totally compressed in 19 and returned to the inlet of the first reactor 1 and possibly of the second reactor 2. The third mixture containing hydrogen and carbon monoxide 34 is sent to the unit 16. Part 43 of the stream 35 may be removed as a purge stream.

The stream rich in hydrogen 14 from the PSA unit 13 is fed to the finishing unit 17 and possibly sent directly to the synthesis unit 16 as stream 42.

The products of the synthesis plant 16 are treated in a finishing plant 17 before leaving the installation.

It will be appreciated that the first reactor could be of the catalytic or non-catalytic type. It will further be appreciated that streams 11 and/or 34 and/or 36 and/or and/or 42 may be sent separately to synthesis unit 16 or may be mixed beforehand.

Figure 4:
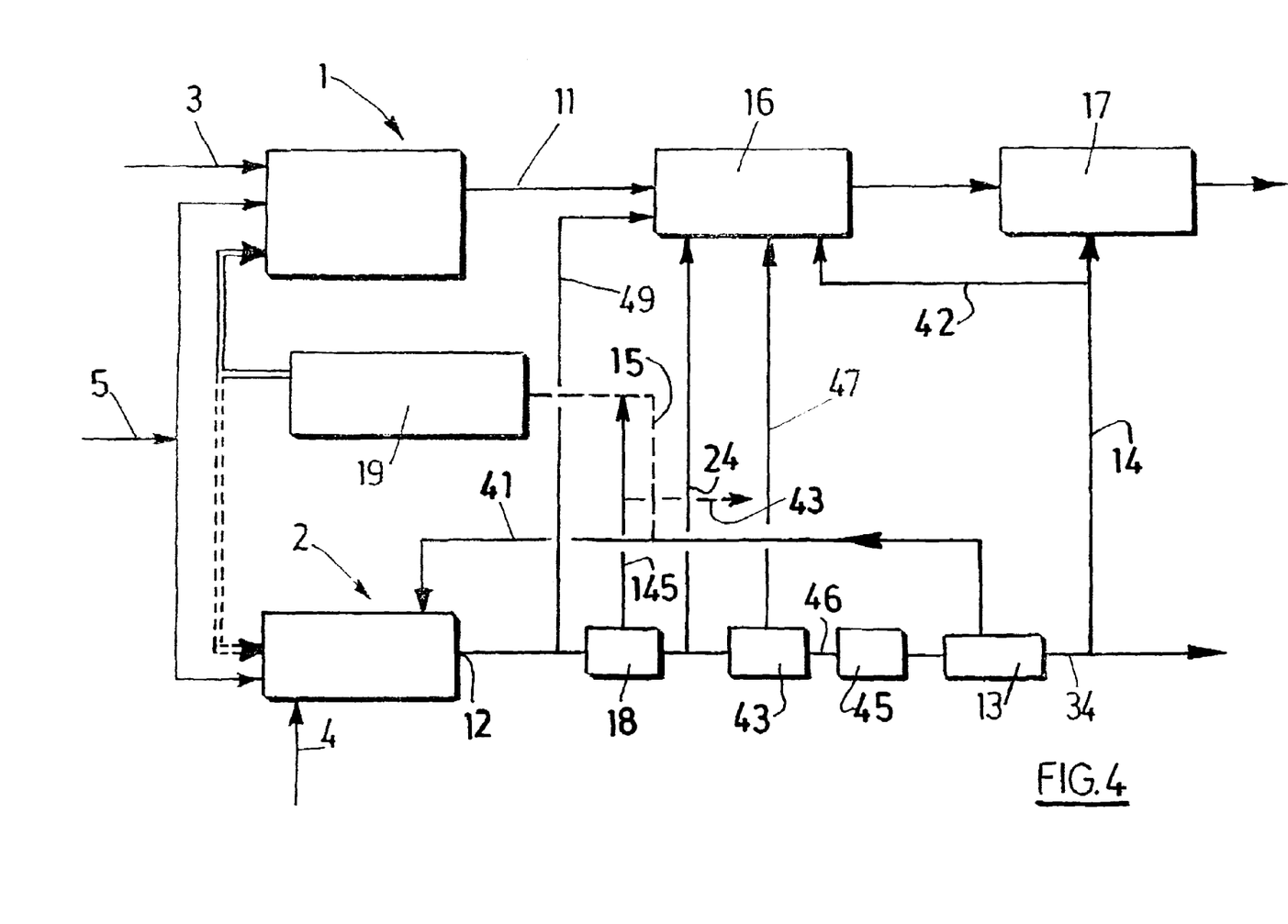
FIG. 4 is a process flow diagram of an integrated process according to the invention using a $CO_2$ removal system, a permeation unit, a permeate recompression unit and a pressure swing adsorption unit to treat at least part of the second mixture.

In FIG. 4, natural gas 5 is sent to a first reactor 1 which is of the POX type and/or to a second reactor 2 which is of the SMR type. A gas 3 containing at least 99 mol. % oxygen is also sent to the first reactor 1 to produce a first mixture 11 containing at least hydrogen and carbon monoxide in proportions of less than 1.8:1. Steam 4 is sent to the second reactor 2.

The second reactor 2 produces a second mixture 12 containing at least carbon monoxide, carbon dioxide and hydrogen.

Part of the second mixture is sent to a carbon dioxide removal unit 18, such as a washing unit, which produces a stream rich in carbon dioxide 145 and a third mixture containing hydrogen and carbon monoxide. The rest 49 of the second mixture may be sent to the synthesis unit 16. Alternatively all the second mixture may be sent to the carbon dioxide removal step 18.

Part of the stream rich in carbon dioxide 145 is compressed in 19 and returned to the inlet of the first reactor 1 and possibly to the second reactor. The other part of the stream 145 may be removed as a purge stream 43.

Part of the third mixture containing hydrogen and carbon monoxide is sent to a permeation unit 43 in which a selective membrane separates the mixture to produce a fourth mixture stream 47 containing hydrogen and carbon monoxide, which is hydrogen depleted and a stream 46 containing hydrogen and carbon monoxide, which is hydrogen enriched. The other part 24 of the third mixture is sent to the synthesis unit 16.

The hydrogen depleted stream 47 is sent to the synthesis reactor 16.

The hydrogen enriched stream 46 is compressed in compressor 45 and sent to an adsorption unit 13 which produces a hydrogen rich stream 14 and a $CO_2$ rich stream which may be recycled (as stream 15 in dashed lines) to the carbon dioxide compressor 19 and/or as sent as fuel 41 to the second reactor.

The stream rich in hydrogen 14 is sent to the finishing unit 17 and/or to the synthesis unit 16 (as stream 42).

The products produced by the synthesis plant 16 are sent to a finishing plan 17 before leaving the installation.

It is to be noted that this embodiment does not involve a shift conversion step.

It will be appreciated that the first reactor could be of the catalytic or non-catalytic type. It will further be appreciated that streams 11 and/or 24 and/or 42 and/or 47 and/or 49 may be sent separately to synthesis unit 16 or may be mixed beforehand.

In all the figures, the first mixture has a hydrogen/carbon monoxide ratio of less than 1,8:1 preferably less than 1,7:1. For all the figures, oxygen is supplied via an air separation unit wherein liquid oxygen is pumped to the operating pressure of the first reactor, vaporised and supplied to the first reactor as pressurized gas. No air is supplied to the first reactor in any case.

The invention claimed is:

1. A process for the production of at least one synthesis gas for a synthesis unit consuming a mixture comprising of carbon monoxide and hydrogen, wherein said process comprising the steps of:
   i) sending oxygen consisting of at least about 99 mol. % concentration and at least one hydrocarbon feedstock selected from the group consisting of: natural gas, coal, and petroleum residues to a first reactor which is a partial oxidation unit to produce a first mixture comprising carbon monoxide and hydrogen,
   ii) sending steam, and at least one feedstock comprising natural gas, and a second feedstock mixture comprising light hydrocarbons to a second reactor which is a steam methane reformer to produce at least one second mixture comprising hydrogen, carbon dioxide and carbon monoxide;
   iii) sending part of the first mixture to form a synthesis gas that will be sent to the synthesis unit;
   iv) sending at least part of the at least one second mixture to a shift converter to react at least part of the carbon monoxide with steam to produce at least one third mixture comprising carbon dioxide and hydrogen;
   v) deriving at least one gas containing of at least about 40 mol. % carbon dioxide from the at least one third mixture; and
   vi) sending at least part of the gas containing at least about 40 mol. % carbon dioxide to an inlet of the first reactor.

2. The process according to claim 1, wherein said process comprises sending at least 99 mol. % oxygen to the inlet of the first reactor from a cryogenic air separation unit.

3. The process according to claim 2, wherein a liquid oxygen is removed from a column of the air separation unit; pumped to an operating pressure of the first reactor; and vaporized and sent as pressurized gas to the inlet of the first reactor; or alternatively, a gaseous oxygen is removed from a column of the air separation unit, and compressed it to an operating pressure of the first reactor and sent to the first reactor.

4. The process according to claim 1, wherein said first mixture comprises a hydrogen/carbon monoxide ratio that ranges from about 1.8:1 up to about 3:1.

5. The process according to claim 4, wherein said mixture comprises a hydrogen/carbon monoxide ratio that ranges from less than about 1.8 to about 1.

6. The process according to claim 1, wherein said third mixture is at least partially treated to form at least one stream comprising at least about 40 mol. % carbon dioxide and a stream enriched in hydrogen.

7. The process according to claim 6, wherein said second mixture consists of a synthesis gas with an $H_2$/CO ratio that ranges higher than about 2/1.

8. The process according to claim 6, wherein at least part of the stream enriched in hydrogen is sent to the synthesis unit.

9. The process according to claim 6, wherein at least part of the stream enriched in hydrogen is sent to a finishing unit.

10. The process according to claim 6, wherein said process comprises sending at least part of the second mixture to the synthesis unit.

11. The process according to claim 6, comprises producing a hydrogen enriched gas and at least about 40 mol. % carbon dioxide from the third mixture via a pressure swing adsorption (PSA).

12. The process according to claim 6, wherein said process produces said hydrogen enriched gas from the third mixture and at least part of the gas comprising of about 40 mol. % carbon dioxide utilizing a $CO_2$ removal unit.

13. The process according to claim 12, wherein said process further comprises of methanation.

14. The process according to claim 12, wherein said $CO_2$ removal unit is selected from the group consisting of: a washing unit, an adsorption unit and a permeation unit.

15. The process according to claim 12, wherein said process comprises sending a gas containing carbon monoxide and hydrogen from the $CO_2$ removal unit to at least one selected from the group consisting of: the synthesis unit, a methanation unit, and a permeation unit.

16. The process according to claim 15, wherein said process comprises sending a gas containing carbon monoxide and hydrogen from the $CO_2$ removal unit to the permeation unit, said gas constituting a fourth mixture, and sending a hydrogen enriched gas (46) from the permeation unit to an adsorption unit (13) and a hydrogen depleted gas to the synthesis unit.

17. The process according to claim 16, wherein said process comprises sending part of the fourth mixture to the synthesis unit.

18. The process according to claim 15, wherein said process comprises sending part of the gas containing carbon monoxide and hydrogen from the $CO_2$ removal unit to a permeation unit and sending a fifth mixture depleted in hydrogen from the permeation unit to the synthesis unit.

19. The process according to claim 1, wherein the first reactor is characterized as a catalytic or a non-catalytic partial oxidation reactor.

20. The process according to claim 1, wherein the first reactor is not fed by an air stream and the second reactor is not fed by an oxygen enriched stream.

21. An installation for the production of at least one gas for a process occurring within a synthesis unit consuming a mixture containing at least carbon monoxide and hydrogen with a hydrogen/carbon monoxide ratio ranges from about 1.8:1 to about 3:1 comprising first and second reactors; wherein said first reactor is a partial oxidation unit and said second reactor is a steam methane reformer each comprising a respective inlet and outlet; and wherein said process comprises the steps of:
(i) sending oxygen comprising a concentration of at least 99 mol. % to the inlet of the first reactor;
(ii) sending at least one hydrocarbon feedstock selected from the group consisting of: natural gas, coal and petroleum residues to the inlet of the first reactor;
(iii) sending steam and at least one feedstock mixture comprising natural gas to the inlet of the second reactor;
(iv) producing a first mixture containing carbon monoxide and hydrogen at the outlet of the first reactor, wherein the first mixture is a synthesis gas;
(v) producing at least one second mixture containing hydrogen, carbon dioxide and carbon monoxide at the outlet of the second reactor;
(vi) providing means for reacting at least part of the carbon monoxide of at least part of the second mixture with steam to produce at least one third mixture comprising carbon dioxide and hydrogen;
(vii) providing means for deriving at least one gas containing carbon dioxide from the at least one third mixture; and
(viii) providing means for sending part of at least one gas containing carbon dioxide to the inlet of the first reactor.

22. The process according to claim 21, wherein providing said means further comprises sending part of at least one gas containing carbon dioxide to an inlet of the second reactor.

23. The process according to claim 21, wherein the sending oxygen is characterized as at least one selected from the group consisting of:
a) means comprising a cryogenic air separation unit;
b) means for removing liquid oxygen from a column of the air separation unit;
c) means for pumping the liquid oxygen to an operating pressure of the first reactor;
d) means for vaporizing pumped liquid; and
e) means for sending the pressurized gas thus produced to the inlet of the first reactor, there being no means for sending air to the inlet of the first reactor.

24. The process according to claim 21, wherein the first reactor is a partial oxidation reactor.

25. The process according to claim 24, wherein a catalyst bed is upstream of the first reactor.

26. The process according to claim 23, wherein said means for deriving a gas consisting of carbon dioxide from the third mixture, comprising the steps of:
(i) removing a $CO_2$ unit;
(ii) sending the third mixture to the $CO_2$ removal unit; and
(iii) sending at least part of the gas consisting of carbon dioxide from the $CO_2$ removal unit to the inlet of the first reactor.

27. The process according to claim 23, wherein the means for sending a gas comprises sending carbon monoxide and hydrogen, from the $CO_2$ removal unit to the outlet of the first reactor and to the synthesis unit.

28. The process according to claim 23, wherein the process comprises a permeation unit and means for sending a fourth mixture from the $CO_2$ removal unit to the permeation unit.

29. The process according to claim 28, wherein the process further comprises means for sending a gas consisting of hydrogen and carbon monoxide from the permeation unit to the synthesis unit.

30. The process according to claim 23, wherein the means for deriving a gas comprising at least carbon dioxide from the third mixture further comprises:
   a. an adsorption unit;
   b. means for sending gas from the outlet of the second reactor to the adsorption unit; and
   c. means for sending a gas consisting of carbon dioxide from the adsorption unit to the inlet of the first reactor.

31. The process according to claim 30, wherein said process comprises of a shift reactor upstream the adsorption unit.

32. The process according to claim 30, wherein said means for sending the gas from the outlet is selected from the group consisting of: shift reactor, the $CO_2$ removal unit, and the permeation unit.

33. The process according to claim 30, wherein said means for sending the gas comprised of hydrogen from the adsorption unit to the synthesis unit.

34. The process according to claim 21, wherein said synthesis unit consuming a mixture comprising of at least carbon monoxide and hydrogen further comprises:
   (i) the finishing unit;
   (ii) means for sending gas from the outlet of the first reactor to the synthesis unit;
   (iii) means for sending gas from the outlet of the synthesis unit to the finishing unit; and
   (iv) means for sending a gas consisting of hydrogen from the adsorption unit or a methanation unit to the finishing unit.

35. The process according to claim 34, wherein said hydrogen/carbon monoxide further comprises a ratio that ranges from about 1.8:1 up to about 3:1.

36. The process according to claim 23, wherein the gas comprising hydrogen sent from the adsorption unit to the finishing unit is purer in hydrogen than the gas comprising hydrogen sent from the adsorption unit to the outlet of the first reactor or to the synthesis unit.

* * * * *